W. E. HASKIN.
ELECTRIC WELDING APPARATUS.
APPLICATION FILED MAR. 20, 1915.

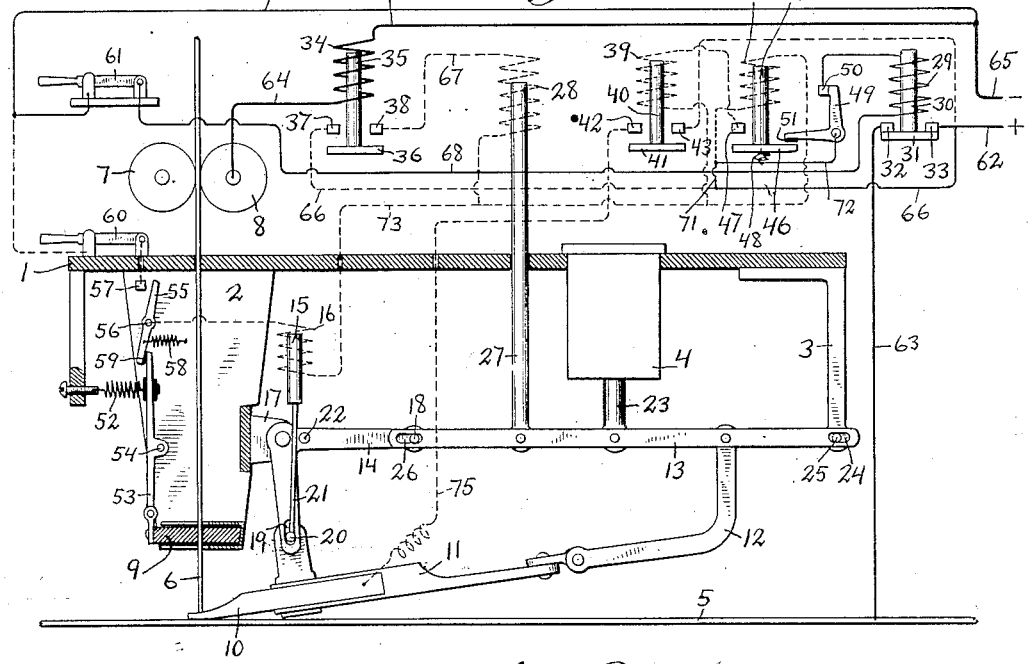

1,162,918.

Patented Dec. 7, 1915.
2 SHEETS—SHEET 2.

Witnesses:
Fred Palm
Chas. L. Goss.

Inventor:
Walter E. Haskin,
By Flanders, Bottum, Fawsett & Bottum
Attorneys.

UNITED STATES PATENT OFFICE.

WALTER E. HASKIN, OF FLUSHING, NEW YORK.

ELECTRIC WELDING APPARATUS.

1,162,918.  Specification of Letters Patent.  Patented Dec. 7, 1915.

Application filed March 20, 1915. Serial No. 15,709.

*To all whom it may concern:*

Be it known that I, WALTER E. HASKIN, a citizen of the United States, residing at Flushing, borough of Queens, New York city, in the county of Queens and State of New York, have invented certain new and useful Improvements in Electric Welding Apparatus, of which the following is a specification, reference being had to the accompanying drawing, forming a part thereof.

This invention relates to electric welding apparatus, and the objects of the invention are to provide an automatic apparatus or machine for establishing an arc between the wire and the work whenever for any reason the arc is interrupted, and for burning off the wire in case it should become stuck to the work and then to reëstablish the arc in the manner to be hereinafter described and claimed.

Figure 3:
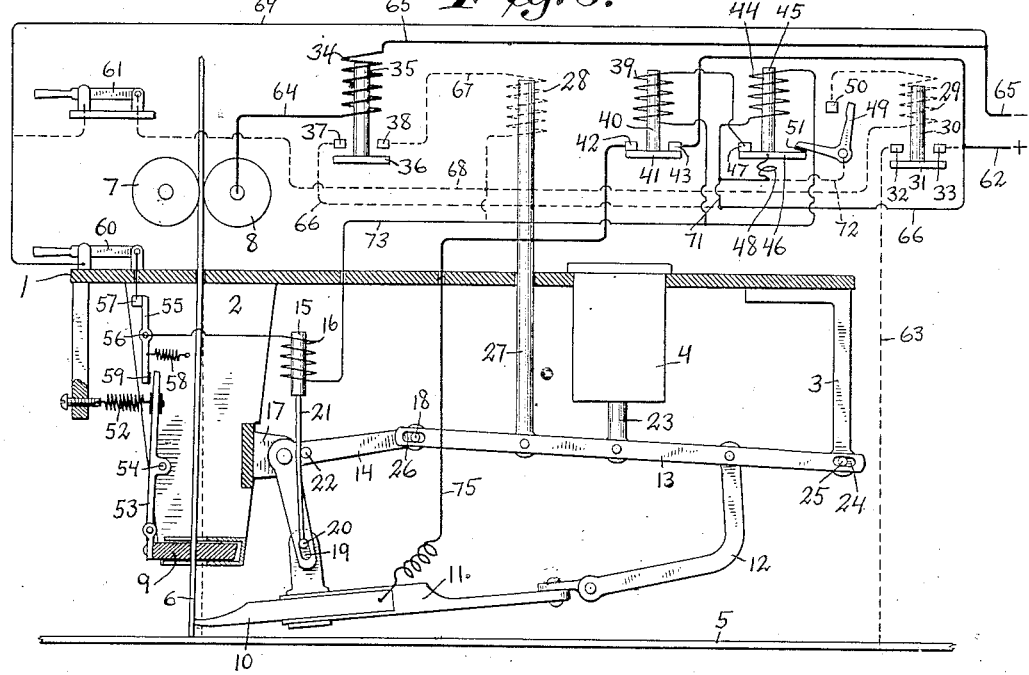
Figure 4:
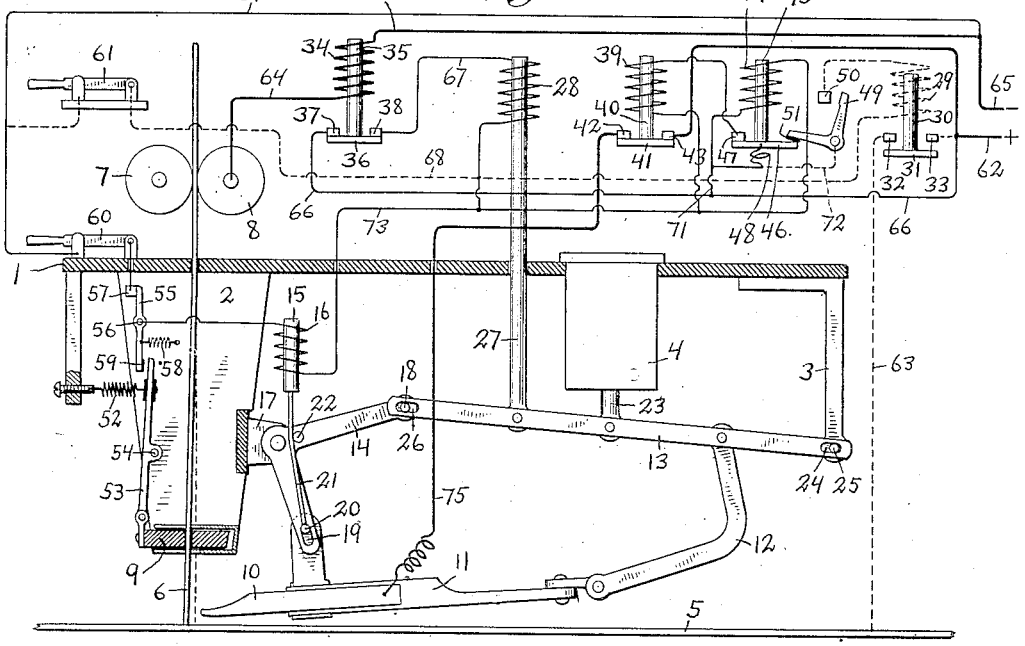

Referring to the drawings which accompany this specification and form a part hereof, on which drawings the same reference characters are used to designate the same parts in the several views, and which drawings illustrate an embodiment of my invention, Figure 1 is a vertical longitudinal section through a part of the apparatus, parts being shown conventionally and in a diagrammatic manner for the sake of clearness of illustration and description; and Figs. 2, 3 and 4 are views similar to Fig. 1, but showing parts as occupying different positions.

Referring to the drawings, the reference numeral 1 designates a support of any suitable character and construction, from which depend brackets 2 and 3 and a dash pot cylinder 4.

The reference numeral 5 designates the work, which is illustrated as sheet metal, and it will be understood of course, that there are two sheets illustrated, the joint between which is to be filled by the metal melted from the wire or rod 6. The wire 6 is fed to the work automatically by the feeding rollers 7 and 8, which may be driven by any suitable mechanism, and the wire is shown as led through an aperture in the support 1 and through an aperture in an insulator block 9, which is reciprocatable within guides on the bracket 2, as will be clearly understood from an inspection of the drawings.

The reference numeral 10 designates an electrode, which may be of any suitable material, but at present I prefer to use carbon for the electrode, because it will not stick to the work being welded. The electrode 10 is insulated from but is supported by a carrier 11, and the carrier 11 is pivotally supported by the bent arm 12 from the lever 13 and the bell crank lever 14, and may also be supported by the armature 15 of the solenoid 16. The bell crank lever 14 is pivotally supported from a bracket 17, which in turn is secured to the bracket 2. Bell crank lever 14 is provided with a pin 18 in one arm and with a slot 19 in its other arm. The slot 19 receives a pin 20, which is secured to a bracket projecting from the carrier 11, and the armature 15 of solenoid 16 is illustrated as connected with the pin 20 by the spring wire 21, which can bend when it contacts with the pin 22 on the bell crank lever 14.

It will readily be seen from an inspection of the drawings that the carrier 11 and its electrode 10 may be supported by the pin 20 resting against the lower part of the slot 19, or may be supported independently of bell crank lever 14 by the armature 15 and the spring wire 21.

The dash pot 4 may be of any ordinary or suitable construction, its function being to retard the movements of the parts to which it is connected so that they will not be violently moved by the magnet mechanism to be hereinafter described. The plunger rod 23 of the dash pot is pivotally connected with the lever 13, and lever 13 has a slot 24 at one end into which projects a pin 25 supported by the bracket 3. The other end of lever 13 is provided with a slot 26 into which the pin 18 on the bell crank lever 14 projects. Between the slot 26 and the plunger rod 23 the armature 27 of the solenoid 28 is pivoted to the lever 13. The armature 27 is illustrated as extending through an aperture in the support 1.

The reference numeral 29 designates a solenoid provided with an armature 30, which carries a switch member 31, adapted to contact with contacts 32 and 33 to close a circuit or to be removed from said contacts to break the circuit.

The reference numeral 34 designates a solenoid provided with an armature 35, which is in turn provided with a switch member 36, adapted to contact with contacts 37 and 38 or to be removed therefrom to make or break a circuit through said contacts.

The reference numeral 39 designates a solenoid provided with an armature 40, which in turn is provided with a switch member 41 adapted to make contact with contacts 42 and 43, or to be separated from said contacts to make or break a circuit therethrough.

The reference numeral 44 designates a solenoid provided with an armature 45, which in turn is provided with a switch member 46 adapted to contact with a contact 47, or to be separated therefrom to make or break a circuit therethrough. The switch member 46 is electrically connected by means of the connection 48 to a wire of one of the circuits, for the purpose to be hereinafter described, and a bell crank switch 49 has one arm extending into the path of movement of the switch member 46, so that the bell crank switch will be turned to separate its other arm from the contact 50, through which it ordinarily establishes a circuit. The bell crank switch is provided with insulation 51 so that an electric circuit cannot be established between it and the switch member 46.

The insulator block 9 is ordinarily held at its extreme limit of movement toward the right hand by the tension of the spring 52, which tends to rock the lever 53 about its pivot 54.

The reference numeral 55 designates a pivoted switch arm in the form of a lever pivoted on the pivot 56 with one end adapted to contact with the contact 57, but normally kept away from said contact by the spring 52. Insulation 59 is interposed between the lower end of the switch arm 55 and the upper end of the lever 53, and the lower end of the switch arm lies in the path of movement of the upper end of lever 53, and it is to be understood of course, that spring 58 is not as powerful as spring 52.

The reference numerals 60 and 61 designate manually controlled switches, by means of which circuits can be made or broken in the ordinary manner.

In the operation of the apparatus it is intended that the electrode 10 shall contact both with the work 5 and the wire 6 to establish an electrical connection between the wire and the work, as shown by Fig. 1 of the drawings, where the electrode 10 is illustrated as swung between the work and the wire and in contact with both the work and the wire. Of course no welding would be accomplished with the parts in this position, so the electrode is drawn out from between the work and the wire, and as it breaks its contact with the work and the wire an arc is established between the work and the wire in the manner which will be readily understood. The electrode 10 is withdrawn to the position shown by Fig. 2 of the drawings, and remains in that position until the arc is broken between the wire and the work, or until the wire sticks to the work. In case the arc is broken between the wire and the work, the electrode 10 is restored to the position shown by Fig. 1 of the drawings, and is then withdrawn from that position to the position shown by Fig. 2 of the drawings, reëstablishing the arc between the wire and the work as it is withdrawn in the manner just explained. This action is entirely automatic, and will be repeated when the apparatus is in use, whenever the arc between the wire and the work is broken.

As thus far explained the action of the apparatus would be entirely automatic were it not for the fact that the wire sometimes sticks to the work. It will be understood of course, that the work is being fed toward the left hand when looking at the figures of the drawings, by any suitable mechanism, not shown. Now in case the wire should stick to the work, the electrode 10 is utilized to contact with the wire above the work and be drawn back to spring an arc between the wire and the electrode, which will immediately burn off the wire. This action is illustrated by Figs. 3 and 4 of the drawings. Fig. 3 shows the condition in which the wire as stuck to the work, has moved to the left with the work, thereby sliding the block 9 to the left, swinging the lever 53 about its pivot 54 against the tension of the spring 52, thereby releasing the switch arm 55, so that it can be swung by the spring 58 to contact with the contact 57, and Fig. 4 shows the electrode 10 as moved back from the wire to draw an arc to burn off the wire, and as soon as the wire is burned off the spring 52 will swing the lever 53 about its pivot, thereby separating the switch arm 55 from contact 57, and at the same time sliding the block 9 and the wire running therethrough, back to their normal positions as shown by Figs. 1 and 2 of the drawings, and the electrode 10 will then be returned to the position shown by Fig. 1 of the drawings to reëstablish the work circuit, and will then be withdrawn to the position shown by Fig. 2 of the drawings to establish the arc between the wire and the work.

It will be understood of course that when the electrode 10 is in the position shown by Fig. 2 of the drawings, it will be so far removed from the arc formed between the wire and the work as not to be affected or influenced in any way by the arc.

I have illustrated diagrammatically and conventionally, simple forms of mechanism for making and breaking circuits, and I do not intend to limit myself to the particular forms of mechanism illustrated and described, as it will be readily apparent to skilled mechanics and electricians that various other forms of apparatus for controlling the action of switch mechanisms can be employed to accomplish the same function and effect as those illustrated by the drawings and described in this specification.

The action of the apparatus is rendered entirely automatic by the switch members, which make various circuits in the manner to be now described.

I have illustrated apparatus for using direct current derived from any suitable source of supply, and referring to Fig. 1 of the drawings, the positive current is supplied to the contact 33 from the wire 62. The current passes from wire 62 through contact 33, switch member 31, contact 32 and wire 63, to the work, the wire 63 being in actual practice connected with the work in any suitable or convenient manner. The current then passes through the work to the electrode 10, from the electrode 10 through the wire 6 to feed roll 8, which is in electrical contact with the wire, and from feed roll 8 by the wire 64 through the coil of the solenoid 34, and thence by the wire 65 back to the dynamo (not shown) or other source of supply, to complete the circuit.

In Fig. 1 of the drawings the parts are shown in the positions which they occupy at the instant the electrode 10 has contacted both with the work 5 and the wire 6, and the work circuit just described has been closed by the electrode 10. The work circuit being closed, the switch member 36 attached to the armature 35 of the solenoid 34, is immediately brought into contact with the contacts 37 and 38. Contact 37 is connected with wire 62 by the wire 66, so that as soon as the switch member 36 contacts with the contacts 37 and 38, a circuit is established from wire 62 through contact 37, switch member 36, contact 38, through wire 67, and the coil of solenoid 28 to wire 68 and through switch 61 to the wire 69, which is connected with wire 65, whereby the armature 27 of solenoid 28 is drawn upwardly, swinging lever 13 about the pin 25 and rocking the bell crank lever 14 which swings the electrode 10 backwardly from between the wire 6 and the work 5, thereby establishing an arc between the work and the wire, and ultimately swings the electrode 10 to the position shown by Fig. 2 of the drawings, where it is removed from the influence of the arc which has been established. The movement of the electrode 10 is slowed by the retarding member illustrated as a dash pot mechanism, so that the electrode 10 is not jerked suddenly away from the wire 6 and the work 5 by the solenoid 28.

With the parts in the positions illustrated by Fig. 2 of the drawings, the arc between the wire 6 and the work 5 is established, the work is being fed to the left hand and the wire is being melted by the arc to supply the necessary metal to make the weld, and the wire is being fed downward continuously by the feeding rolls 7 and 8, and Fig. 2 illustrates the normal positions of the parts while the welding operation is taking place.

It should be noted that with the parts in the positions illustrated by both Figs. 1 and 2 of the drawings, the wire 62 is in electrical communication with the wire 63 by means of the automatic circuit breaker, which is the switch member 31 connected to the armature 30 of the solenoid 29. This automatic circuit breaker is kept closed by the current which passes from wire 62 through wires 66, 71 and 72, the bell crank switch 49, contact 50, the coil of solenoid 29, wire 68, switch 61 and wire 69, which is connected with the wire 65.

Referring now to Fig. 3 of the drawings, the wire 6 is stuck to the work 5, and has been carried to the left hand with the work, as clearly illustrated by Fig. 3 of the drawings. The wire 6, in moving to the left, has moved the block 9 to the left, and has rocked the lever 53 about its pivot 54 against the tension of spring 52, with the result that the switch arm 55 has been freed and the spring 58 has caused the switch arm 55 to make contact with the contact 57. The solenoid 16 is in the same circuit with the coils of the solenoids 44 and 39, and the contact of switch lever 55 with contact 57 establishes a circuit from wire 62 through wire 66, wire 71, solenoid 44, wire 73, solenoid 16, switch arm 55, contact 57, switch 60 and wire 69 to wire 65. The energizing of the solenoid 44 draws up its armature 45 and the switch member 46 connected thereto, and the switch member 46 rocks the bell crank switch 49 away from contact 50, thereby breaking the circuit through solenoid 29 and permitting its armature 30 and the switch member 31 connected thereto, to drop, thereby breaking the circuit between wires 62 and 63. The switch member 46 is connected with the wire 62 by the connection 48 and the wires 72, 71 and 66, and when the switch member 46 contacts with the contact 47, a circuit is established through the solenoid 39 and wire 73, and the solenoid pulls up the armature 40 and the switch member 41 into contact with the contacts 42 and 43, thereby switching the welding current on to the wire 75 which is connected with the electrode 10.

During the momentary break of the welding circuit caused by the dropping of the switch member 31, the solenoid 34 is deenergized, permitting the armature 35 and the switch member 36 to drop, thereby breaking the circuit through the solenoid 28 and permitting the armature 27 and lever 13 to drop, which permits the bell crank lever 14 to be swung down by the weight of the electrode 10 and the carrier 11, and the electrode 10 swings to the left into contact with the wire 6 above the work 5, because the energization of the solenoid 16 has pulled the armature 15 up and the electrode 10 is supported in an elevated position by the armature 15, the spring wire 21 and the pin 20. The current is now established through wire 62, wire 75, electrode 10, wire 6, feeding roll 8, wire 64, solenoid 34 and wire 65, and the armature 35 of the solenoid 34 will be raised, bringing the switch member 36 into contact with the contacts 37 and 38, thereby establishing the circuit through wires 66 and 67, solenoid 28, and wires 68 and 73 to wires 69 and 65. The solenoid 28 draws up its armature 27 and the lever 13 thereby rocking the bell crank lever 14 and swinging the electrode 10 to the right away from the wire 6 and drawing an arc which melts the wire 6 and frees it from the work 5, before the electrode 10 has been withdrawn to its extreme limit of movement. Further movement of the electrode 10 to the right breaks the arc and stops the flow of current from wire 62 through contact 43, switch member 41, contact 42, wire 75, electrode 10, wire 6, feeding roll 8, wire 64, and solenoid 34 to wire 65, so that solenoid 34 is deënergized, its armature 35 and the switch member 36, carried thereby, drop and break the circuit through solenoid 28, thereby permitting the armature 27 and lever 13 to drop and swing the electrode 10 down between the wire 6 and the work 5 to reëstablish the welding arc between the wire 6 and the work 5 as hereinbefore described.

When the wire 6 is freed from the work in the manner just described, the spring 52 rocks the lever 53 about its pivot 54 and slides the block 9 to the right restoring the wire 6 to the position from which it was moved while stuck to the work. This movement of lever 53 swings the switch arm 55 away from contact 57 and breaks the circuit through solenoids 16, 39 and 44. The breaking of the circuit through solenoid 16 permits its armature 15 and the electrode 10 to drop until the pin 20 is supported by the bottom of the slot 19 in the bell crank lever. The breaking of the circuit through the solenoid 44 permits its armature 45 and the switch member 46 to drop and open or break the circuit through solenoid 39 and permits the bell crank switch 49 to swing back into contact with the contact 50 and close the circuit through the solenoid 29 whereby the switch member 31 is brought into contact with the contacts 33 and 32 and the welding circuit from wire 62 to wire 63 is reëstablished. The breaking of the circuit through the solenoid 39 permits its armature 40 and the switch member 41 to drop, thereby cutting wire 62 off from communication with wire 75, or, in other words, breaking the burning off circuit.

While I have illustrated and described simple forms of magnet switch mechanisms and wires for several electrical circuits, I do not limit this invention to the forms of switch mechanisms and connections illustrated and described for the reasons, as hereinbefore stated, that other forms of switch mechanisms and connections can readily be substituted for the specific forms illustrated to obtain the same results.

What is claimed is:

1. In electric welding apparatus, the combination with the work to be welded, a wire to be melted to effect the weld and a movable electrode adapted to establish an electric circuit between the work to be welded and the wire to be melted, of means controlled by the welding current in the said circuit to move the electrode to establish an arc between the work and the wire.

2. In electric welding apparatus, the combination with the work to be welded, a wire to be melted to effect the weld and a movable electrode adapted to establish an electric circuit between the work to be welded and the wire to be melted, of means for moving said electrode to establish an arc between the work and the wire and for holding said electrode away from said arc, said means being controlled by the welding current in said circuit.

3. In electric welding apparatus, the combination with a wire to be melted by an electric arc, of a movable electrode, and means controlled by a movement of said wire to cause the electrode to contact with the wire above the work and to be moved away from the wire to form an arc to melt the wire.

In witness whereof I hereto affix my signature in presence of two witnesses.

WALTER E. HASKIN.

Witnesses:
JOHN C. ANDREWS,
C. S. JENNINGS.